United States Patent
Hamilton et al.

(10) Patent No.: US 10,275,912 B1
(45) Date of Patent: Apr. 30, 2019

(54) MULTI-DIMENSIONAL VISUALIZATION AND RESOURCE EVALUATION SYSTEM

(71) Applicant: Accenture Global Solutions Limited, Dublin (IE)

(72) Inventors: Mary Elizabeth Hamilton, San Mateo, CA (US); Taurean Dyer, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 17 days.

(21) Appl. No.: 15/798,879

(22) Filed: Oct. 31, 2017

(51) Int. Cl.
| | |
|---|---|
| *G06T 11/20* | (2006.01) |
| *G06F 17/30* | (2006.01) |
| *G06F 3/01* | (2006.01) |
| *G06F 16/29* | (2019.01) |
| *G01C 21/00* | (2006.01) |
| *G06Q 10/06* | (2012.01) |

(52) U.S. Cl.
CPC ............ *G06T 11/206* (2013.01); *G01C 21/00* (2013.01); *G06F 3/011* (2013.01); *G06F 16/29* (2019.01); *G06F 17/30241* (2013.01); *G06Q 10/06313* (2013.01)

(58) Field of Classification Search
CPC ....... G06T 11/206; G01C 21/00; G06F 3/011; G06F 17/30241; G06Q 10/06313
See application file for complete search history.

(56) References Cited

U.S. PATENT DOCUMENTS

| | | | |
|---|---|---|---|
| 6,321,158 B1* | 11/2001 | DeLorme | G01C 21/26 340/995.16 |
| 2011/0161875 A1* | 6/2011 | Kankainen | G06F 3/0481 715/810 |
| 2011/0246064 A1* | 10/2011 | Nicholson | G01C 21/00 701/467 |
| 2013/0138338 A1* | 5/2013 | Behara | G01S 19/20 701/458 |
| 2016/0223355 A1* | 8/2016 | Habib | G01C 21/3492 |
| 2017/0028556 A1* | 2/2017 | Summer | B25J 9/1664 |
| 2017/0243567 A1* | 8/2017 | Fung | G06F 3/04815 |
| 2018/0018782 A1* | 1/2018 | Menozzi | G06F 1/163 |

OTHER PUBLICATIONS

Frantis, Advanced presentation layer in C3I system, URL:http://citeseerx.ist.psu.edu/viewdoc/download?doi=10.1.1.152.9049&rep=rep1&type=pdf (Year: 2007).*
Frantis, Virtual Reality in Presentation Layer of C3I System, URL: https://www.nnssanz.org.au/modsinn05/papers/frantis.pdf (Year: 2005).*

* cited by examiner

Primary Examiner — Jacinta M Crawford
Assistant Examiner — Phuc N Doan
(74) *Attorney, Agent, or Firm* — Brinks Gilson & Lione (57) ABSTRACT

Resource visualization, evaluation, and selection is often a difficult, complex, technically challenging endeavor. This is particularly true when there the resource set is extensive, the resources have widely varying attributes and capabilities, and the resources are also widely disbursed geographically. A multi-dimensional resource evaluation and visualization system implements technical solutions to these technical challenges.

9 Claims, 8 Drawing Sheets

MULTI-DIMENSIONAL VISUALIZATION AND RESOURCE EVALUATION SYSTEM

TECHNICAL FIELD

This application relates to visual navigation through complex multi-dimensional parameter spaces.

BACKGROUND

Resource visualization, evaluation, and selection is often a difficult, complex, technically challenging endeavor. This is particularly true when there the resource set is extensive, the resources have widely varying attributes and capabilities, and the resources are also widely disbursed geographically. Improvements in multi-dimensional resource evaluation and visualization will help meet the technical challenges noted above.

DETAILED DESCRIPTION

Effectively identifying, evaluating, instantiating, reserving, executing, and communicating with the resources needed to successfully accomplish complex projects is a significant technical challenge. The multi-dimensional visualization and resource evaluation (MVRE) system architecture described below provides technical solutions to finding, analyzing, and allocating geographically distributed resources to link together for execution of a complex task. The MVRE system provides a central control mechanism for discovering, monitoring, reserving, connecting, and updating resources that can be discovered and allocated singly or as an aggregation of resources to carry out any given project.

FIGS. 1-4 provides an example contexts for the discussion below of the technical solutions in the MVRE system. The discussion below of FIGS. 1-4 refers to a few of many possible implementations. In that respect, the technical solutions are not limited in their application to the implementations or the context shown in any of the Figures, but are applicable to many other system implementations.

Figure 1:
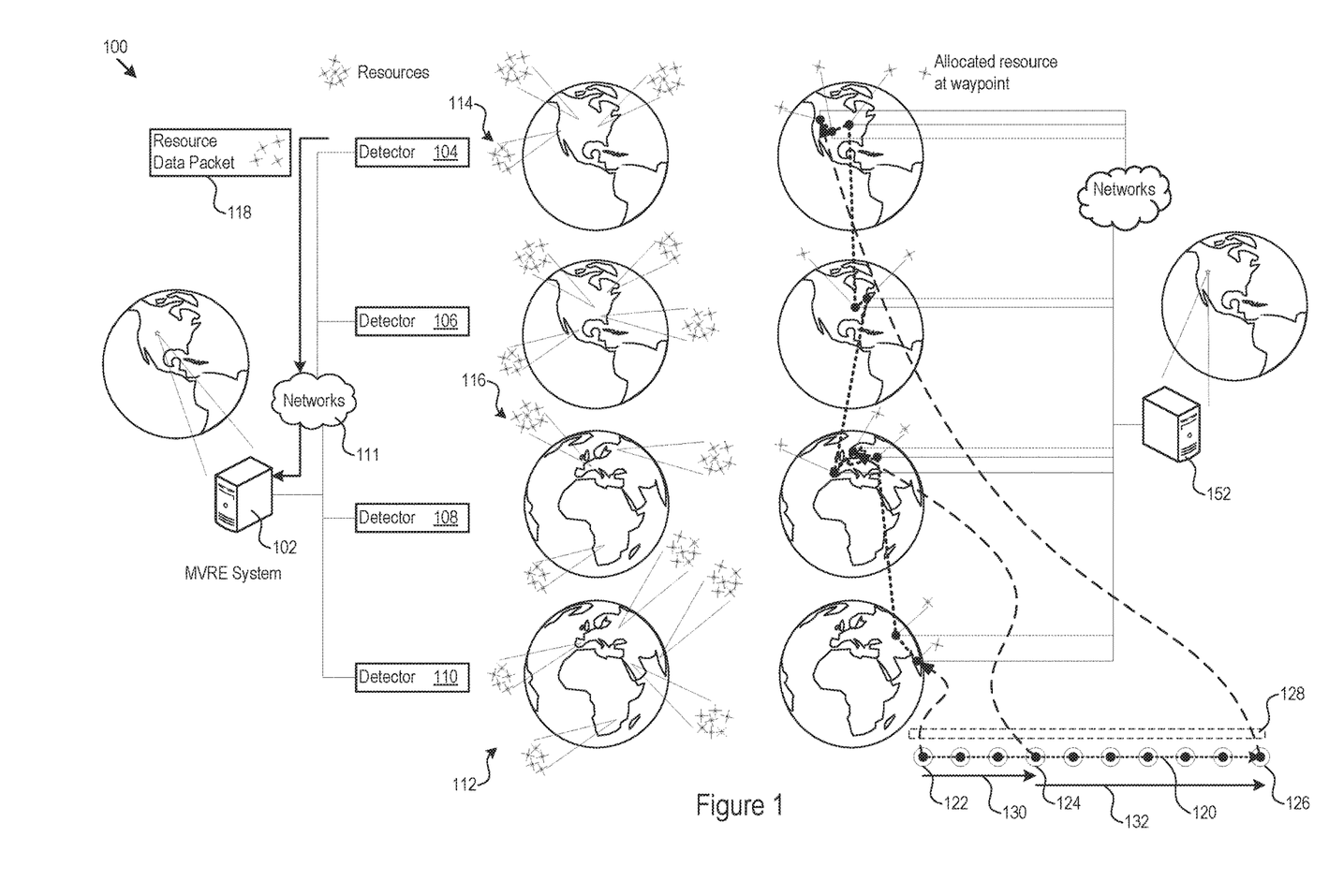
FIG. 1 shows an example of the operation of a multi-dimensional visualization and resource evaluation (MVRE) system.

FIG. 1 shows an example 100 of the operation of a multi-dimensional visualization and resource evaluation (MRVE) system 102. The MVRE system 102 connects to resource detectors, e.g., the resource detectors 104, 106, 108, and 110, over any number and type of networks 111. The resource detectors identify available resources and transmit associated resource data to the MVRE system 102. The detectors may be implemented as web data connectors (WDC) within or external to the MVRE system 120. The WDCs are, for instance, configured to read data from any resource data host that provides data in JSON, XML, HTML, or other formats. That is, the MVRE system 102 may communicate with any external resource data hosts to obtain resource data and project data. Examples of resource data hosts include systems such as Upwork, Toptal, and Freelancer. Additional examples of resource data hosts include enterprise on-premise employee databases and individually or privately curated websites.

A project may execute across any pre-determined geography. For instance, a project may execute locally within a data center at a single enterprise location. As another example, a project may execute in sequential stages across multiple cities, states, and countries, thereby spanning many different time zones. For any project geography, resources may or may not be available at any part of the geography or stage of the project.

FIG. 1 shows a worldwide geography 112. FIG. 1 also shows clusters of resources available in different locations in the geography. For instance, the resources 114 are available in central California, United States, while the resources 116 are available in Munich, Germany. The detectors transmit the resource data for the available resources to the MVRE system 102 in resource data packets 118. The resource data packets 118 carry information characterizing the resources, referred to as resource descriptors.

The resources and resource descriptors may be present at many different resource sites globally, and for certain types of resources (e.g., virtualized computing resources) the resource sites are service providers that host the resources. The resource sites, resources and resource descriptors may be located in any geographic region, e.g., United States (US) East, US West, Africa, BRIC countries, or Central Europe. Resources may correspond to any element that can be assigned to project execution, including tools, machines, components, chemicals, vehicles, foundries, fabrication centers, manufacturing plants or processing plants, algorithm packages, computing hardware or software resources or even specific individuals. The resource descriptors characterize, define, or describe the resources. As a few examples, the resource descriptors may specify abilities, speed, reliability, location, availability, cost, maintenance requirements, capability, capacity, experience, skill descriptors, historical performance data, and execution capabilities. Resources and resource descriptors may also be present locally within an enterprise that seeks to carry out a project (e.g., in an on-premise resource database), in addition to being geographically distributed.

FIG. 1 also shows a project plan 120. The project plan includes multiple waypoints, such as the starting waypoint 122, intermediate waypoint 124, and the ending waypoint 126. The waypoints may represent, for instance, project status, goals, or inputs and outputs at each stage of the project. For the purposes of discussion, assume that that starting waypoint 122 represents microprocessor VLSI layout, the intermediate waypoint 124 represents VLSI circuit testing and verification, and the ending waypoint 126 represents VLSI semiconductor fabrication.

In the example in FIG. 1, path planning circuitry in the MVRE system 102 has mapped the project plan 120 to the worldwide geography to determine a waypoint distribution 128 of the path waypoints across time zone boundaries. In the example of FIG. 1, VLSI layout occurs in Mumbai, India, UTC+5:30; VLSI circuit testing occurs 3.5 hours later in Ängelholm, Sweden, UTC+1:00/+2:00; and VLSI fabrication occurs 9 hours later in Walla Walla, Wash., United States, UTC-8:00/-7:00. As a result, the waypoint distribution 128 places some path waypoints in different time zones than other path waypoints, and this is one way in which the MVRE system 102 may define project flow segments between any two waypoints that encompass continuing project execution. One project flow segment 130 lies between the starting waypoint 122 and the intermediate waypoint 124, encompassing the handoff from Mumbai to Ängelholm. Another project flow segment 132 lies between the intermediate waypoint 124 and the ending waypoint 126, encompassing the handoff from Ängelholm to Walla Walla. Expressed another way, given the differences in time zone, one project waypoint may complete in time for a subsequent project waypoint to come online and start on the next stage of the project, resulting in continuous or nearly continuous project execution. The MVRE system 102 may achieve continuing project flow in other ways, e.g., by mapping project plan waypoints to different shifts of work within a common time zone.

Figure 2:
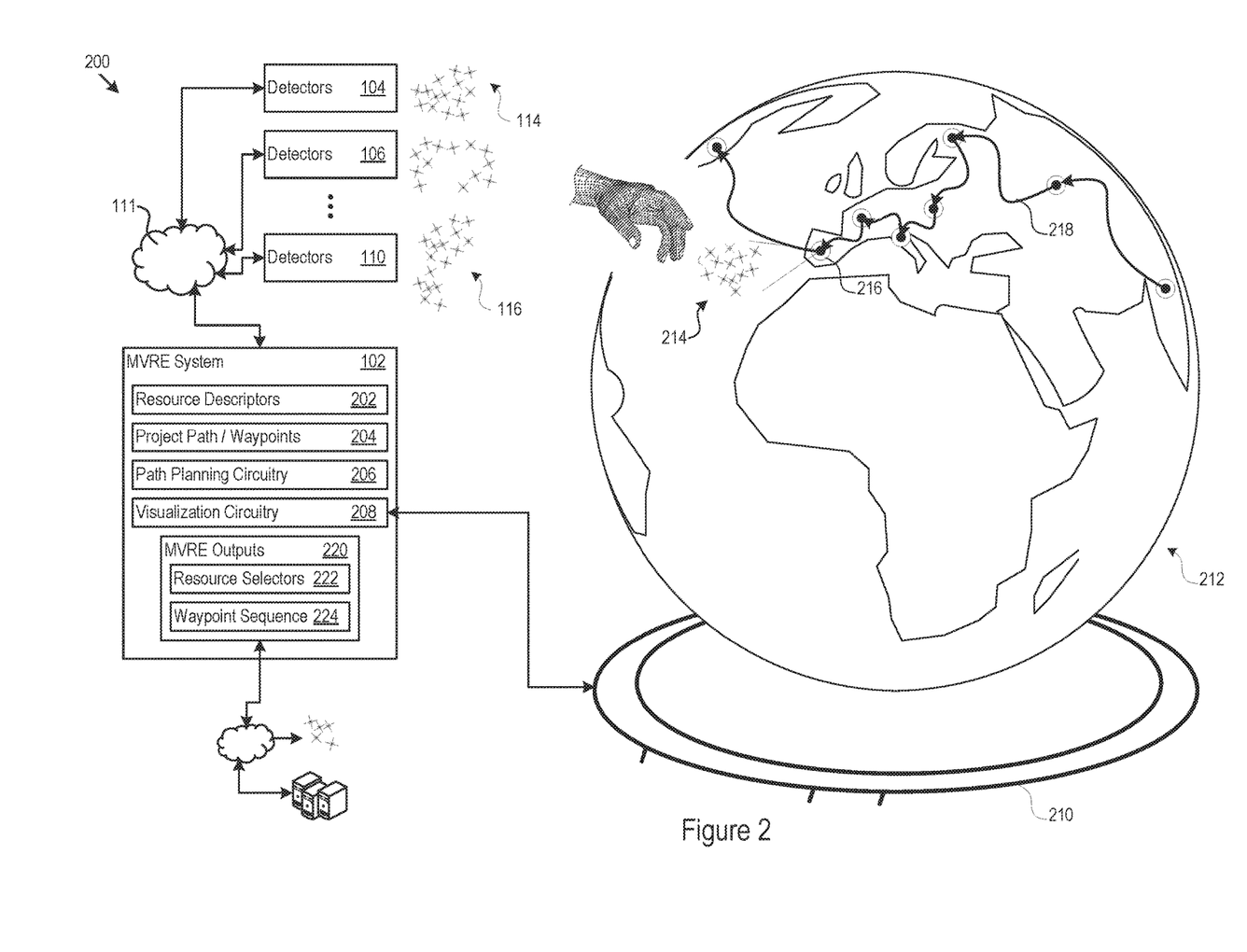
FIG. 2 shows additional detail of the MVRE system.

FIG. 2 shows exemplary additional detail 200 of the MVRE system 102. In this example, the MVRE system 102 captures resource descriptors 202 and project path definitions 204, including project path waypoints. The path planning circuitry 206 maps the project plans to a pre-defined geography to determine a waypoint distribution of the path waypoints across working boundaries, such as time zone or work shift boundaries in order to help deliver continuing project flow. Described in more detail below, the visualization circuitry 208 implements control peripheral interfaces; view rendering circuitry, e.g., including the image projector 210, configured to generate a resource analysis visualization 212, e.g., a 2D or 3D image rendering; and view guidance circuitry. The resource analysis visualization 212 may display, as examples, available resources 214 rendered on the pre-determined geography, as well as the path waypoints 216 and project segments 218 that show sequential stages of project flow rendered on the pre-determined geography; and view guidance circuitry.

The MVRE system 102 generates a wide range of MVRE outputs 220. For instance, the MVRE system 102 may transmit resource selectors 222 to any of the resources, or the resource data hosts. The resource selectors 222 may specify, as examples: selection, reservation, or allocation of a resource to a project path waypoint; may include requests for additional information from the resources; or may include other messages to the resources or resource data hosts. As another example, the MVRE system 102 may transmit waypoint sequences to the resources to inform them of the project path and their place along the path, as well as to project management systems or entities charged with monitoring or supervising execution of the project.

Figure 3:
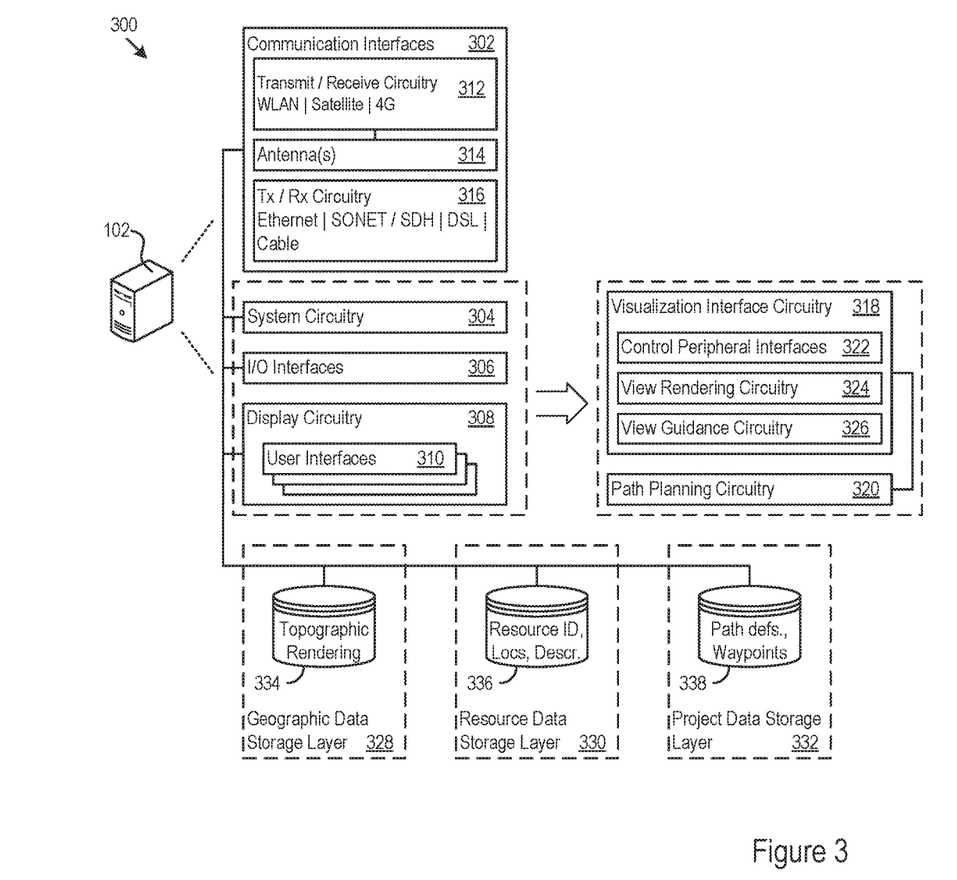
FIG. 3 shows an example implementation of an MVRE system.

FIG. 3 shows another example implementation 300 of the MVRE system 102. The MVRE system 102 includes communication interfaces 302, system circuitry 304, input/output (I/O) interfaces 306, and display circuitry 308. The user interface (UI) generation instructions 344 generate UIs 310 locally using the display circuitry 308, or for remote display, e.g., as HTML output for a web browser running on a local or remote machine. Among other interface features, the UIs 310 may facilitate entry and specification of project paths, waypoints, required resource characteristics for the waypoints, the applicable geography for project execution, e.g., global, Europe, North America, United States, Germany, Italy, California, Illinois, or any other geography), and other aspects.

The UIs 310 and the I/O interfaces 306 may include graphical user interfaces (GUIs), touch sensitive displays, voice or facial recognition inputs, buttons, switches, speakers and other user interface elements. Additional examples of the I/O interfaces 306 include microphones, video and still image cameras, headset and microphone input/output jacks, Universal Serial Bus (USB) connectors, memory card slots, and other types of inputs. The I/O interfaces 306 may further include magnetic or optical media interfaces (e.g., a CDROM or DVD drive), serial and parallel bus interfaces, and keyboard and mouse interfaces.

The communication interfaces 302 may include wireless transmitters and receivers ("transceivers") 312 and any antennas 314 used by the transmit circuitry and receive circuitry of the transceivers 312. The transceivers 312 and antennas 314 may support WiFi network communications, for instance, under any version of IEEE 802.11, e.g., 802.11n or 802.11ac. The communication interfaces 302 may also include physical medium transceivers 316. The physical medium transceivers 316 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 304 may include any combination of hardware, software, firmware, or other circuitry. The system circuitry 304 may be implemented, for example, with one or more systems on a chip (SoC), application specific integrated circuits (ASIC), microprocessors, discrete analog and digital circuits, and other circuitry. The system circuitry 304 is part of the implementation of the functionality in the MVRE system 102. As one example, the system circuitry 304, I/O interfaces 306, and display circuitry 308 include visualization interface circuitry 318 and path planning circuitry 320. Described in more detail below, the visualization interface circuitry 318 includes, in this example, control peripheral interfaces 322, view rendering circuitry 324, and view guidance circuitry 326.

The MVRE system 102 may include any number of data storage layers. FIG. 3 shows a geographic data storage layer 328, a resource data storage layer 330, and a project data storage layer 332. The geographic data storage layer 328 may store, for instance, topographic rendering data 334 for the pre-determined project plan geography. The resource data storage layer 330 may store resource data 336 including, as examples, resource identifiers for available resources in the pre-determined geography, resource locations for the available resources in the pre-determined geography, and resource descriptors for the available resources. The project data storage layer 332 may store project data 338 including, as examples, a project path definition comprising path waypoints and waypoint descriptors for the path waypoints. The waypoint descriptors may specific waypoint characteristics such as resource reservation flags to indicate which resources have been assigned or allocated (if any) to the waypoint; project input/output requirements (e.g., work product output); timing specifiers (e.g., specifying when the input/output requirements must be met); and resource requirements (e.g., specifying the characteristics of the resources needed for the executing the tasks defined at the path waypoint).

Figure 4:
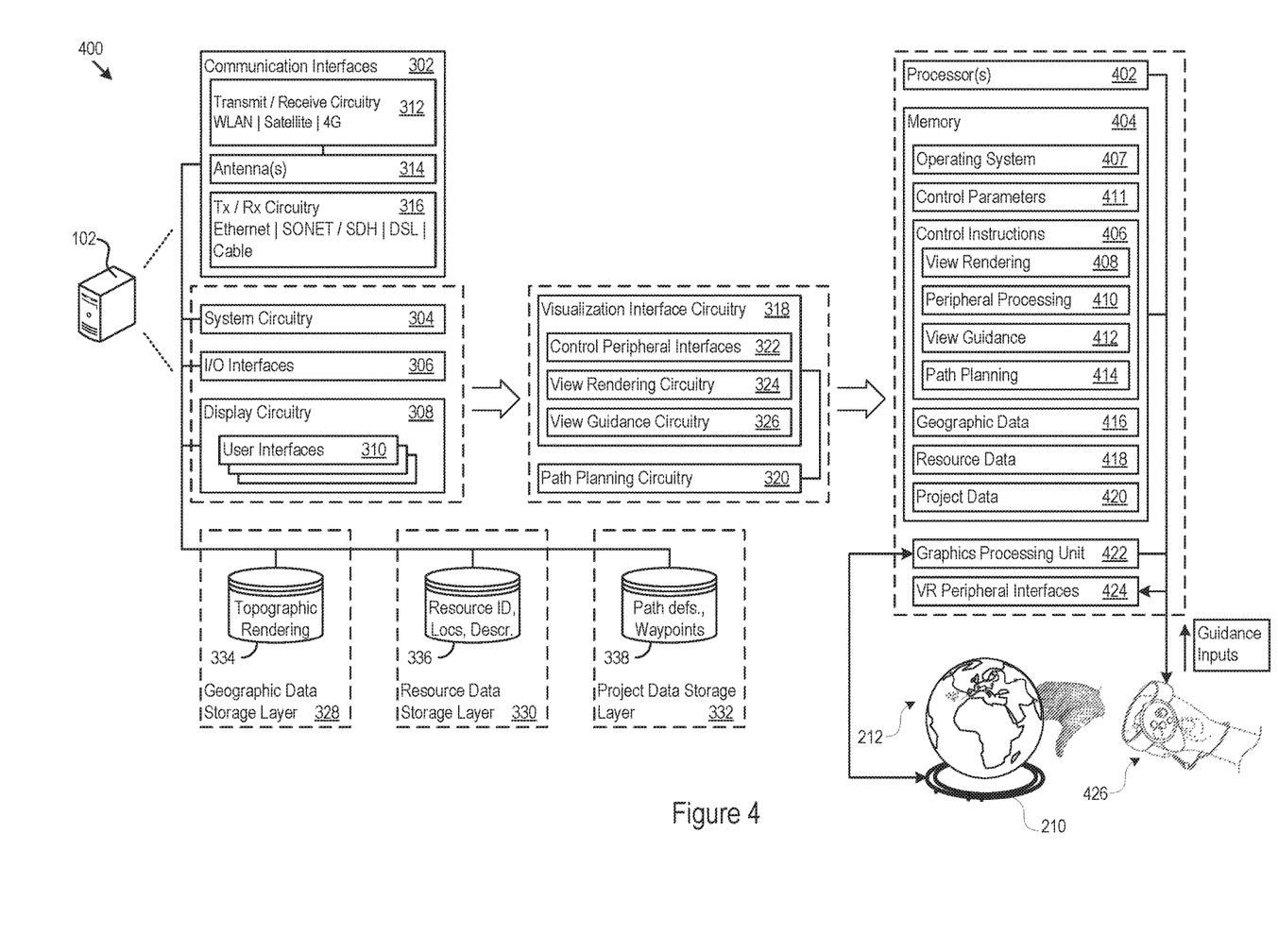
FIG. 4 shows another example implementation of an MVRE system.

FIG. 4 provides an expanded implementation example 400 for the MVRE system 102. FIG. 4 shows that the system circuitry 304, including the visualization interface circuitry 318 and the path planning circuitry 320, may be implemented as a flexible, reconfigurable, and efficient instruction processing architecture that also supports hardware interactions through the I/O interfaces 306 and the display circuitry 308. In that respect, the system circuitry 304 may include one or more instruction processors 402 and memories 404. The memory 404 stores, for example, control instructions 406 and an operating system 407. In one implementation, the processor 402 executes the control instructions 406 and the operating system 407 to carry out the functionality for the MVRE system 102. The control parameters 411 provide and specify configuration and operating options for the control instructions 406, operating system 407, and other functionality of the MVRE system 102.

In an instruction processing architecture like that shown in FIG. 4, the control instructions 406 drive the functionality of the MVRE system 102. In the example of FIG. 4, the control instructions 406 include view rendering instructions 408, peripheral processing instructions 410, view guidance instructions 412, and path planning instructions 414. For any particular project plan, the memory 404 may store operational data retrieved from the data storage layers 328-332. For instance, the memory 404 may store geographic data 416 retrieved from the geographic data storage layer 328 and that the view rendering instructions 408. As another example, the memory 404 may store resource data 418 retrieved resource data storage layer 330 and project data 420 retrieved from the project data storage layer 332.

The view rendering instructions 408 selectively hand off the geographic data 416, resource data 418 and project data 420 to the graphics processing unit (GPU) 422. In turn, the GPU 422 renders a resource analysis visualization of the pre-determined geography, available resources and project information. The GPU 422 may be, for instance, a 3D graphics accelerator available from NVidia or AMD, e.g., an NVidia 1060, 1070 or 1080 (TM) GPU.

FIG. 4 shows that the I/O interfaces 306 include control peripheral interfaces 322. More particularly, the I/O interfaces 306 include virtual reality (VR) or augmented reality (AR) interfaces 424. In additional to traditional mouse, voice recognition, and keyboard input handled by the I/O interfaces 306, the VR peripheral interfaces 424 (and GPU 422) provide system support for VR peripherals 426 including VR headsets, e.g., the HTC Vive (TM) headset or Oculus Rift (TM) headsets; gyroscopes; accelerometers; speakers; magnetometers; glasses; VR gloves, e.g., with haptic feedback and touch interfaces; arm, chest, and wrist position, orientation, and velocity trackers; and VR controllers, e.g., a Samsung Gear (TM) VR controller or Oculus Rift (TM) controller that provide hand tracking, sub-millimeter object detection, XYZ position sliders and discrete input buttons.

The view guidance instructions 412 respond to the VR peripherals 426 to perform, e.g., resource selection; motion, rotation, and zoom control of the pre-determined geography; and motion, rotation, and zoom control of specific available resources to help the operator focus on specific available resources among potentially large and obscuring clouds of available resources. In that respect, the view guidance instructions 412 may implement VR image manipulation and tracking techniques including, e.g., constellation tracking, lighthouse tracking, eye tracking, and head tracking.

One of many use cases for the MVRE system 102 is microteaming. In this role, the MVRE system 102 detects the resources available in each region of the pre-defined project geography. The MVRE system 102 renders the pre-determined geography, e.g., in a VR display, and renders resource clouds on the pre-determined geography that visualize the detected available resources, e.g., each shown as a pre-defined 2D or 3D graphical element. The MVRE system 102 responds to the VR peripherals 426 by facilitating operator review, analysis, and selection of resources, with project path mapping to tie the resources together into a sequence of waypoints that accomplishes the project plan. With the path planning instructions 414 mapping waypoints to time zones, the MVRE system 102 also facilitates detection and allocation of selected resources along a time zone path that allows workflow to continue efficiently, e.g., continuously as work product is handed from one time zone to a following time zone.

In addition to microteaming, the MVRE system 102 implements a digital visualization of optimized aggregate resource structures. The MVRE 102 may determine and deliver specific data points on the aggregate structures, based on weighted evaluation of skills, personality, strengths, education, availability, and other characteristics of the resources. As one example, the aggregate resource structures may be teams of individuals, and the MVRE system 102 may evaluate the characteristics of each individual according to any pre-defined preferences or weights, and a pre-defined optimization function (e.g., a function that yields a total score of education plus experience). In addition, as resources are selected for the team, the MVRE system may then specifically search for, locate, display or otherwise facilitate locating, evaluating, and selecting resources still needed for any project path waypoint. That is, the MVRE system 102 responds to resource selections by evaluating resource characteristics for available resources who may be considered remaining team positions. The MVRE system 102 may then guide the operator through dense clouds of available resources to more efficiently find, evaluation, and select a best-matching resource for the open position. In other scenarios, the aggregate resource structure may be a set of tools, machines, algorithms, or other mechanical elements detected and selected at specific project path waypoints to carry out the project. In these scenarios too the MVRE system may specifically search for, locate, display (e.g., by rotating, translating, zooming or otherwise updating the resource analysis visualization) or otherwise facilitate locating, evaluating, and selecting any machine, tool, algorithm, or other resources still needed for any project path waypoint, given a pre-selected optimization function, parameters, and optimization weights.

To provide an efficient operator/machine interface, the MVRE system 102 generates an AR/VR interface and responds to AR/VR navigation controls. The MVRE system 102 responds to the AR/VR navigation controls and other inputs to virtually move the operator through the dense clouds of available resources and their characteristics. The MVRE system 102 also responds to the AR/VR navigation controls and other inputs to allow the operator to select project workflow optimized resources, as well as aggregations of resources as team units assigned to one or more project waypoints. The MVRE system 102 thereby implements technical solutions for addressing visual and information overload in graphical user interfaces, thereby improving the machine interface and reducing wasted time and energy resources in searching for resources for a project. Note also that once resources are selected and allocated, the MVRE system 102 greatly facilitates changes to the allocations, e.g., dynamic reconfiguration of resource allocations. Accordingly, when, for instance, a particular selected resource is not performing well, the operator can quickly find a replacement resource through the MVRE system 102, and replace the prior resource with the newly selected resource. The MVRE system 102 is also configured to generate other types of three-dimensional (3D) visualizations by generating 3D interfaces and corresponding 3D navigation controls.

The MVRE system 102 may be implemented in many different ways, and not all of the elements noted above are required in every implementation. For instance, the path planning circuitry 320 may be omitted in some implementations. As another example, the view rendering instructions 408 may cause varying levels of information and detail to appear in the resource analysis visualization. In that respect, the resource analysis visualization may or may not include the pre-determined geography, the detected resources, or the project plan or waypoints. In still other implementations, the MVRE system 102 includes or omits the VR peripheral interfaces 424, and may instead rely on more traditional mouse, keyboard, or voice control via the I/O interfaces 306.

In one example implementation, the MVRE system 102 includes a geographic data storage layer with topographic rendering data for a pre-determined geography and a resource data storage layer including: 1) resource identifiers for available resources in the pre-determined geography and 2) resource locations for the available resources in the pre-determined geography, and resource descriptors for the available resources. The MVRE system 102 also includes a project data storage layer including: 1) a project path definition comprising path waypoints, 2) waypoint descriptors for the path waypoints, and 3) a specification of the pre-defined geography over which the project path is allowed to execute. The waypoint descriptors may include, e.g., resource reservation flags, project input/output requirements, timing specifiers, and resource requirements.

In the example implementation, the MVRE system 102 further includes virtual reality interface circuitry in communication with the geographic data storage layer, the resource data storage layer, and the project data storage layer. The virtual reality interface circuitry includes control peripheral interfaces configured to connect with virtual reality control peripherals and view rendering circuitry configured to generate a resource analysis visualization comprising the available resources rendered on the pre-determined geography and the path waypoints rendered on the pre-determined geography. View guidance circuitry in the MVRE system 102 may accept guidance inputs from the virtual reality control peripherals and direct the view rendering circuitry to update the resource analysis visualization responsive to the guidance inputs. The view guidance circuitry may further accept selection inputs from the virtual reality control peripherals that specify selected resources among the available resources for designated waypoints among the path waypoints. Further, the MVRE system 102 may include communication circuitry configured to transmit resource selection messages to the selected resources for the designated waypoints.

In some implementations, the geographic data storage layer also includes time zone boundaries that divide the pre-determined geography into different time zones. The path planning circuitry may then be configured to determine a waypoint distribution of at least one of the path waypoints across a selected time zone boundary and into a different time zone than other path waypoints to define a segment of continuous project flow. In this case, the view rendering circuitry is responsive to the waypoint distribution by generating the resource analysis visualization to show the path waypoints located across the selected time zone boundary, and by generating the resource analysis visualization to show available resources specific to time zones in which the path waypoints are located according to the waypoint distribution.

In another example implementation, the MVRE system 102 includes a data storage layer comprising a project path definition comprising path waypoints located within a pre-determined geography, geographic data representing the pre-determined geography, and resource descriptors for available resources within the pre-determined geography. Visualization circuitry in the MVRE system 102 is in communication with the data storage layer. The visualization circuitry may include view rendering circuitry configured to render a resource analysis visualization. The resource analysis visualization may include all or some of the pre-determined geography represented by the geographic data, all or some of the path waypoints rendered on the pre-determined geography, and all or some of the resource identifiers rendered on the pre-determined geography and linked to the resource descriptors. In this example implementation, the MVRE system 102 also includes view guidance circuitry configured to accept guidance inputs from input devices and direct the view rendering circuitry to update the resource analysis visualization responsive to the guidance inputs. In that respect, as examples, a virtual hand or finger may rotate a globe; may cause XY translation of a state, country or region; or may cause the geography to zoom in or zoom out. As additional examples, a virtual pointer may limit the cloud of displayed resources according to a pre-defined filter, may zoom in or out on a resource to display resource characteristics such as name, abilities, face, location, education, or other characteristics, or may select a resource to allocate the resource to a project waypoint.

More generally, the visualization circuitry includes a control peripheral interface configured to connect with control peripherals, receive guidance inputs for the resource analysis visualization from the control peripherals, and deliver the guidance inputs to the view guidance circuitry. Also, the visualization circuitry, via, e.g., the control peripheral interface, may connect with the control peripherals, receive resource selection inputs with respect to the resource identifiers from the control peripherals, and deliver the resource selection inputs to the view guidance circuitry. The communication circuitry in the MVRE system 102 is configured to transmit resource selection messages to selected resources corresponding to the resource selection inputs.

In this example implementation as well, the data storage layer may include a geographic data storage layer storing topographic rendering data for the pre-determined geography and time zone boundaries that divide the pre-determined geography into different time zones. Path planning circuitry in the MVRE system 102 is configured to determine a waypoint distribution of at least one of the path waypoints across a selected time zone boundary and into a different time zone than other path waypoints to define a segment of continuous project flow. In turn, the view rendering circuitry is configured to respond to the waypoint distribution by generating the resource analysis visualization to show the path waypoints located across the selected time zone boundary. The view rendering circuitry may also respond to the waypoint distribution by generating the resource analysis visualization to show available resources specific to time zones in which the path waypoints are located according to the waypoint distribution.

In this example implementation, the data storage layer may also include a resource data storage layer. The resource data storage layer may store resource identifiers for the available resources in the pre-determined geography, resource locations for the available resources in the pre-determined geography, and the resource descriptors for the available resources. Further, the data storage layer may include a project data storage layer comprising a project path definition comprising the path waypoints and waypoint descriptors for the path waypoints. The waypoint descriptors may include, as just a few examples, resource reservation flags to indicate which resources are allocated to which waypoints (if any), project input/output requirements, timing specifiers for completion of the waypoint or the input/ output requirements, and resource requirements that specify the characteristics of the resources that are needed to execute the waypoint tasks.

FIGS. 5, 6, 7, and 8 show logic 500, 600, 700, and 800 that may be implemented in MVRE system, e.g., in the visualization interface circuitry 318, the path planning circuitry 320, or the control instructions 406. The MVRE system provides a data storage layer with a project path definition of path waypoints located within a pre-determined geography (502). The MVRE system also provides, in the data storage layer, geographic data representing the pre-determined geography (504), and resource descriptors for available resources within the pre-determined geography (506).

Figure 5:
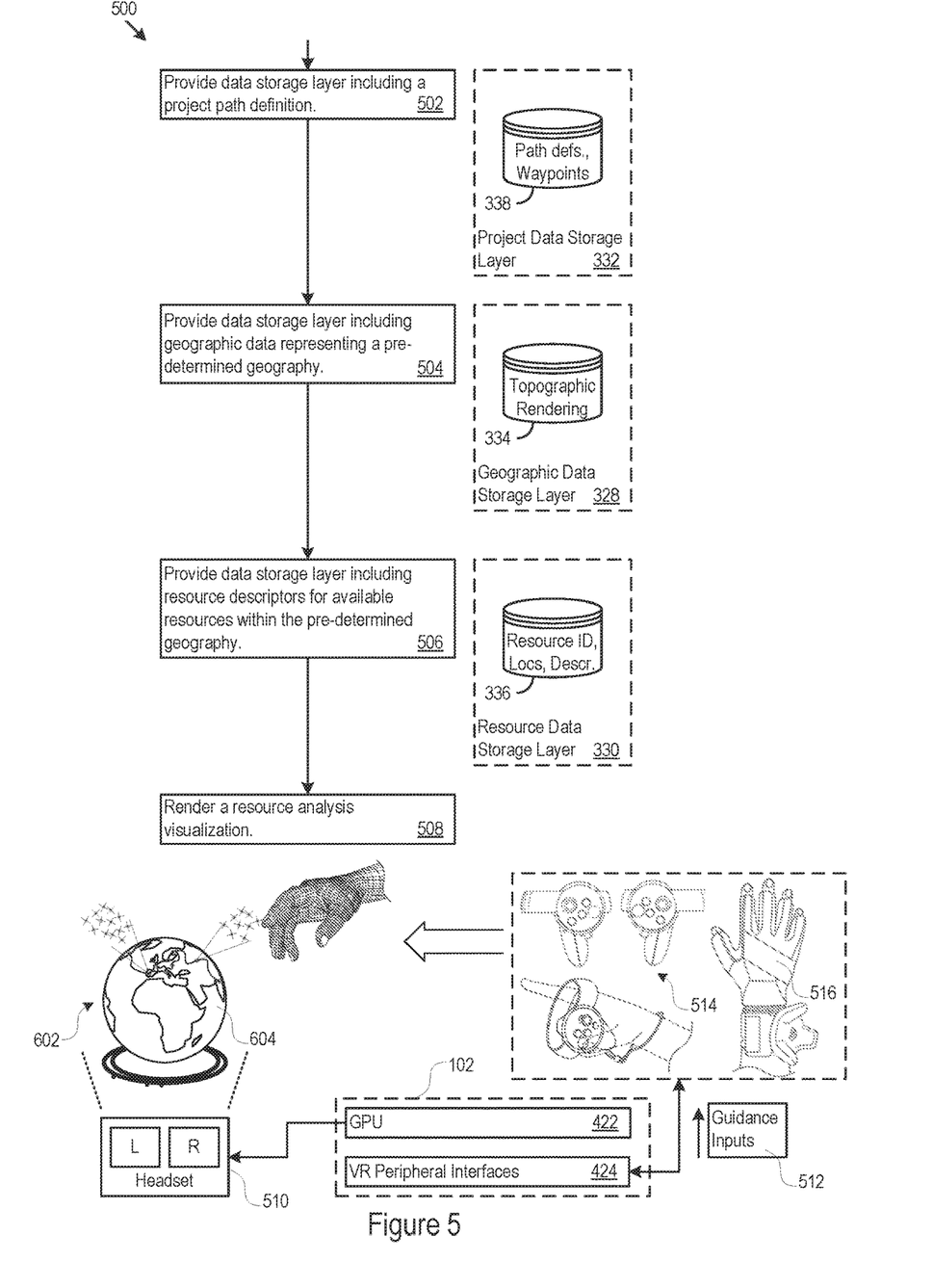
FIGS. 5, 6, 7, and 8 show logic that may be implemented in MVRE system.
Figure 6:
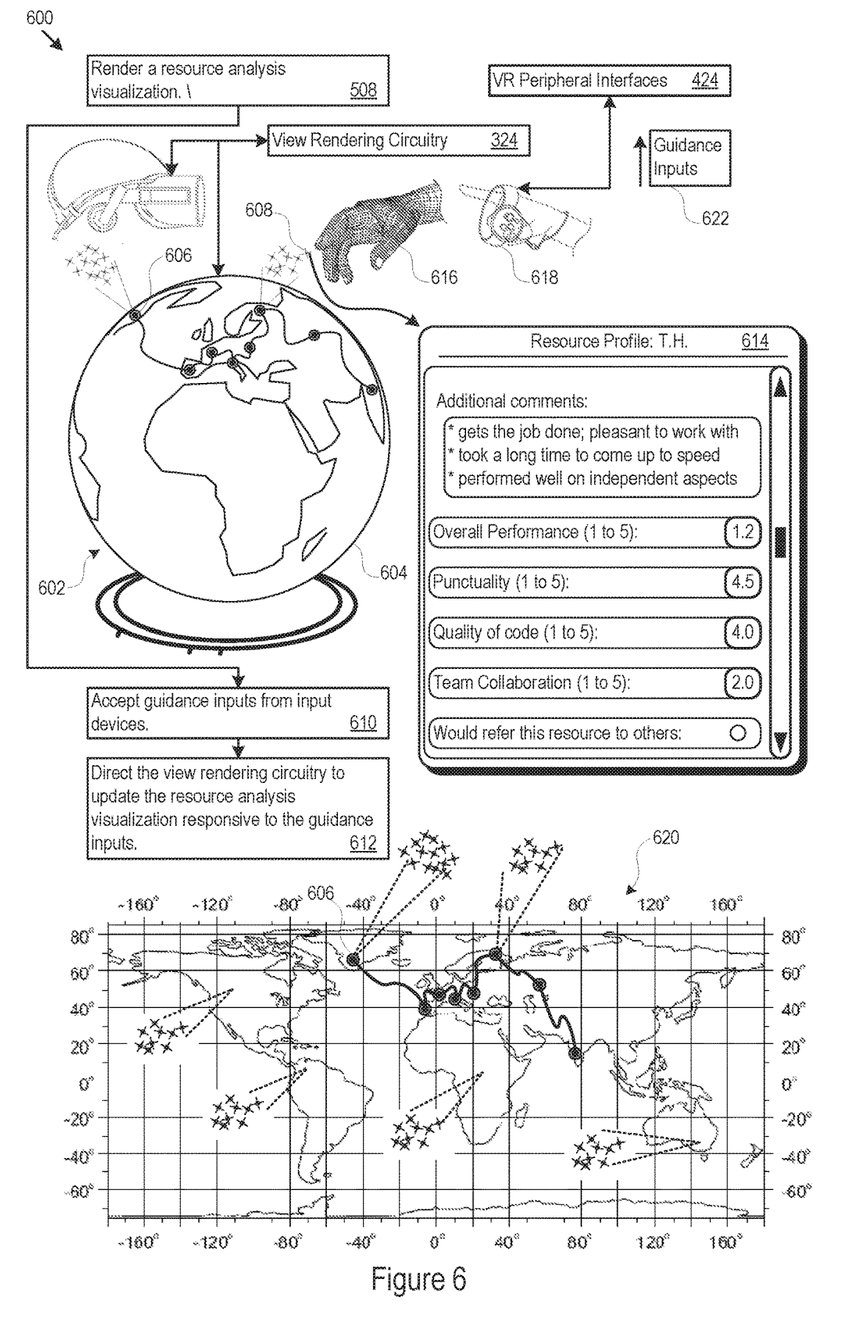

As shown in FIGS. 5-8, the MVRE system uses view rendering circuitry to generate a resource analysis visualization 602 (508). The resource analysis visualization 602 displays the pre-determined geography 604 represented by the geographic data. In this example, the GPU 422 drives left and right pixel displays in a headset 510 to render a 3D VR view of the pre-determined geography 604. FIG. 6 shows additional detail. In particular, the resource analysis visualization 602 also includes the path waypoints 606 rendered on the pre-determined geography 604 and resource identifiers 608 rendered on the pre-determined geography. The resource identifiers 608 are linked to the resource descriptors in the data storage layer, and the system responds to pre-configured types of guidance inputs 512 to highlight and display the resource descriptors in the resource analysis visualization 602. Guidance inputs 512 may arrive from many different types of peripherals; FIG. 5 shows VR controllers 514 and VR gloves 516.

Expressed another way, the MVRE system includes view guidance circuitry configured to accept guidance inputs from input devices (610) and direct the view rendering circuitry to update the resource analysis visualization responsive to the guidance inputs 622 (612). In the example shown in FIG. 6, one update is the presentation in the resource analysis visualization of the resource characteristic data 614, selected by the VR pointer 616 that tracks the VR controller 618 via the control peripheral interface. Another example of the updated resource analysis visualization is to render an expanded geography view 620. The expanded geography view 620 shows in one view the entire global geography including latitude, and longitude locators. The system may further render time zone lines that partition the geography into different time zones.

Figure 7:
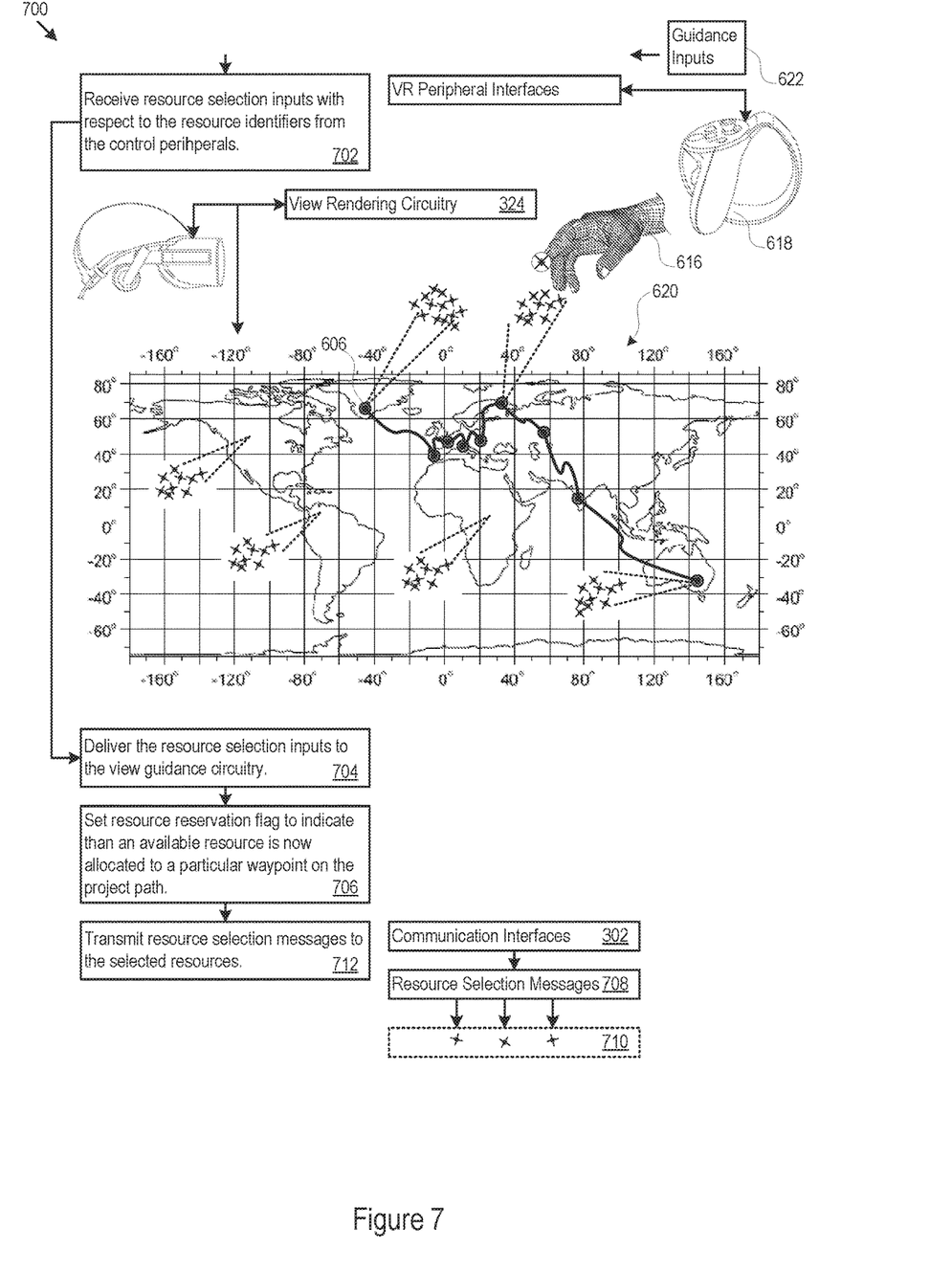

As noted above, the MVRE system may also receive resource selection inputs with respect to the resource identifiers from the control peripherals (702) and deliver the resource selection inputs to the view guidance circuitry (704). The MVRE system may respond by setting resource reservation flags to indicate that an available resource is now allocated to a particular waypoint on the project path (706). The communication circuitry in the MVRE system may then transmit a resource selection message 708 to the selected resource 710 corresponding to the resource selection inputs (712).

Figure 8:
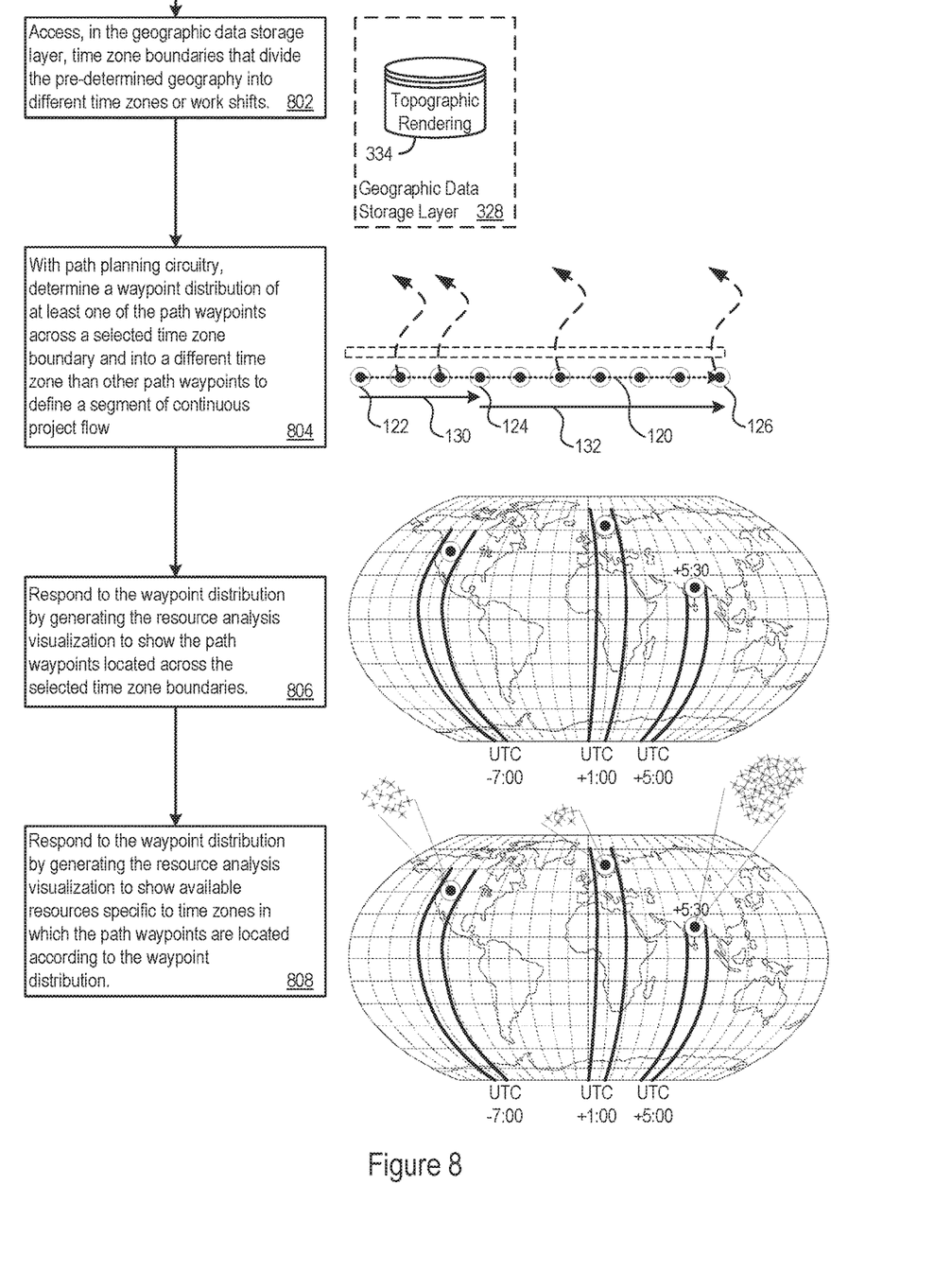

Additional processing actions may be taken at any point in the execution of the MVRE system 102. For instance, the MVRE system may access, in the geographic data storage layer, boundaries that divide the pre-determined geography into different time zones or work shifts (802). The MVRE system may then, with path planning circuitry, determine a waypoint distribution of at least one of the path waypoints across a selected time zone boundary and into a different time zone than other path waypoints to define a segment of continuous project flow (804). The view rendering circuitry may then respond to the waypoint distribution by generating the resource analysis visualization to show the path waypoints located across the selected time zone boundary (806). In addition, the view rendering circuitry may respond to the waypoint distribution by generating the resource analysis visualization to show available resources specific to time zones in which the path waypoints are located according to the waypoint distribution (808).

Although the described features have been presented to be utilized with geographic-based data, the same features are also applicable to analyze and visualize any type of data. For example, the data visualization features may be applied using non-geographic-based data such as historical work data, historical Internet browsing history, crowdsource data, or other types of data that may be stored on a database and benefits from the visualization features described herein.

The methods, devices, processing, circuitry, and logic of the navigation system described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The MVRE system 102 may implement the logic for multi-dimensional visualization and resource evaluation in any combination of the control instructions 406, control parameters 411, visualization interface circuitry 318, path planning circuitry 320 or other elements shown in the Figures. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. In other implementations, any of the databases may be part of a single database structure, and, more generally, may be implemented logically or physically in many different ways. Each of the databases defines tables storing records that the control instructions read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
a geographic data storage layer configured to store:
topographic rendering data for a pre-determined geography; and
time zone boundaries that divide the pre-determined geography into different time zones;
a resource data storage layer configured to store:
resource identifiers for available resources in the pre-determined geography;
resource locations for the available resources in the pre-determined geography; and
resource descriptors for the available resources;
a project data storage layer configured to store:
a project path definition comprising path waypoints;
waypoint descriptors for the path waypoints, the waypoint descriptors including:
resource reservation flags;
project input/output requirements;
timing specifiers; and
resource requirements;
virtual reality interface circuitry in communication with the geographic data storage layer, the resource data storage layer, and the project data storage layer, the virtual reality interface circuitry comprising a VR processor configured to:
control one or more control peripheral interfaces to connect with virtual reality control peripherals;
control view rendering circuitry to generate a resource analysis visualization comprising the available resources rendered on the pre-determined geography and the path waypoints rendered on the pre-determined geography;
control view guidance circuitry to:
accept guidance inputs from the virtual reality control peripherals and direct the view rendering circuitry to update the resource analysis visualization responsive to the guidance inputs; and
accept selection inputs from the virtual reality control peripherals that specify selected resources among the available resources for designated waypoints among the path waypoints; and
communication circuitry comprising a communication processor configured to control transmission of resource selection messages to the selected resources for the designated waypoints; and
path planning circuitry comprising a path planning processor configured to:
determine a waypoint distribution of at least one of the path waypoints across a selected time zone boundary and into a different time zone than other path waypoints to define a segment of continuous project flow;
and where:
the view rendering circuitry is responsive to the waypoint distribution by:
generating the resource analysis visualization to show the path waypoints located across the selected time zone boundary; and
generating the resource analysis visualization to show available resources specific to time zones in which the path waypoints are located according to the waypoint distribution.

2. A system comprising:
a data storage layer configured to store:
a project path definition comprising path waypoints located within a pre-determined geography;
geographic data representing the pre-determined geography; and
resource descriptors for available resources within the pre-determined geography; and
visualization circuitry in communication with the data storage layer, the visualization circuitry comprising a visualization processor configured to:
control view rendering circuitry to render a resource analysis visualization comprising:
the pre-determined geography represented by the geographic data;
the path waypoints rendered on the pre-determined geography; and
resource identifiers rendered on the pre-determined geography and linked to the resource descriptors;
control view guidance circuitry to:
accept guidance inputs from input devices; and
direct the view rendering circuitry to update the resource analysis visualization responsive to the guidance inputs;
path planning circuitry comprising a path planning processor configured to:
determine a waypoint distribution of at least one of the path waypoints across a selected time zone boundary and into a different time zone than other path waypoints to define a segment of continuous project flow;
where the visualization circuitry further comprises providing a control peripheral interface configured to:
connect with control peripherals;
receive the guidance inputs for the resource analysis visualization from the control peripherals; and
deliver the guidance inputs to the view guidance circuitry;
where the data storage layer comprises a geographic data storage layer configured to store:
topographic rendering data for the pre-determined geography; and
time zone boundaries that divide the pre-determined geography into different time zones;
where the view rendering circuitry is configured to respond to the waypoint distribution by one of:
generating the resource analysis visualization to show the path waypoints located across the selected time zone boundary; or generating the resource analysis visualization to show available resources specific to time zones in which the path waypoints are located according to the waypoint distribution.

3. The system of claim 2, where the visualization circuitry further comprises:
the control peripheral interface configured to:
connect with the control peripherals;
receive resource selection inputs with respect to the resource identifiers from the control peripherals; and
deliver the resource selection inputs to the view guidance circuitry.

4. The system of claim 3, further comprising:
communication circuitry configured to transmit resource selection messages to selected resources corresponding to the resource selection inputs.

5. The system of claim 2, where:
the data storage layer comprises:
a resource data storage layer configured to store:
resource identifiers for the available resources in the pre-determined geography;
resource locations for the available resources in the pre-determined geography; and
the resource descriptors for the available resources.

6. The system of claim 2, where:
the data storage layer comprises:
a project data storage layer configured to store:
a project path definition comprising the path waypoints;
waypoint descriptors for the path waypoints, the waypoint descriptors including:
resource reservation flags;
project input/output requirements;
timing specifiers; and
resource requirements.

7. A method comprising:
providing a data storage layer configured to store:
a project path definition comprising path waypoints located within a pre-determined geography;
geographic data representing the pre-determined geography; and
resource descriptors for available resources within the pre-determined geography; and
providing visualization circuitry in communication with the data storage layer, the visualization circuitry comprising a visualization processor configured to:
control view rendering circuitry to render a resource analysis visualization comprising:
the pre-determined geography represented by the geographic data;
the path waypoints rendered on the pre-determined geography; and
resource identifiers rendered on the pre-determined geography and linked to the resource descriptors;
control view guidance circuitry to:
accept guidance inputs from input devices; and
direct the view rendering circuitry to update the resource analysis visualization responsive to the guidance inputs;
providing path planning circuitry comprising a path planning processor configured to:
determine a waypoint distribution of at least one of the path waypoints across a selected time zone boundary and into a different time zone than other path waypoints to define a segment of continuous project flow;
where the visualization circuitry further comprises providing a control peripheral interface configured to:
connect with control peripherals;
receive the guidance inputs for the resource analysis visualization from the control peripherals; and
deliver the guidance inputs to the view guidance circuitry;
where providing the data storage layer comprises providing a geographic data storage layer configured to store:
topographic rendering data for the pre-determined geography; and
time zone boundaries that divide the pre-determined geography into different time zones;
where the view rendering circuitry is responsive to the waypoint distribution by:
generating the resource analysis visualization to show the path waypoints located across the selected time zone boundary; and
where the view rendering circuitry is responsive to the waypoint distribution by:
generating the resource analysis visualization to show available resources specific to time zones in which the path waypoints are located according to the waypoint distribution.

8. The method of claim 7, where the visualization circuitry further comprises:
providing the control peripheral interface configured to:
connect with the control peripherals;
receive resource selection inputs with respect to the resource identifiers from the control peripherals; and
deliver the resource selection inputs to the view guidance circuitry.

9. The method of claim 8, further comprising:
providing communication circuitry configured to transmit resource selection messages to selected resources corresponding to the resource selection inputs.

* * * * *